United States Patent
Sheidlower et al.

[15] 3,653,357
[45] Apr. 4, 1972

[54] ENTOMOLOGICAL OBSERVATION DEVICE

[72] Inventors: Stanley S. Sheidlower, 43 Burton Avenue, Woodmere, N.Y. 11598; Elliot S. Glanz, 4005 Greentree Drive, Oceanside, N.Y. 11572

[22] Filed: June 1, 1970

[21] Appl. No.: 41,917

[52] U.S. Cl. ................................... 119/1, 119/15
[51] Int. Cl. ........................................ A01k 01/00
[58] Field of Search .................. 119/1, 17, 15; 6/1, 9, 15; 35/20

[56] References Cited

UNITED STATES PATENTS

| 2,080,160 | 5/1937 | Austin | 119/1 |
| 925,209 | 6/1909 | Livermore | 35/20 |
| 3,088,134 | 5/1963 | Abel | 6/1 |

FOREIGN PATENTS OR APPLICATIONS

| 321,355 | 11/1929 | Great Britain |

*Primary Examiner*—Hugh R. Chamblee
*Attorney*—Polachek & Saulsbury

[57] ABSTRACT

A device for entomological observation comprised of a modular enclosed structural unit having transparent walls and adapted to simulate therein the natural environment of the insects under study. The modular unit is further provided with openings in top and bottom walls for permitting interlocking engagement between several of the units for assembly or stacking thereof. Flexible transparent plastic tubing is used to interconnect the several units to allow the insects therein to traverse between the units. A magnifying lens is affixed to one of the transparent walls for enlarging any insects within the field of view.

5 Claims, 10 Drawing Figures

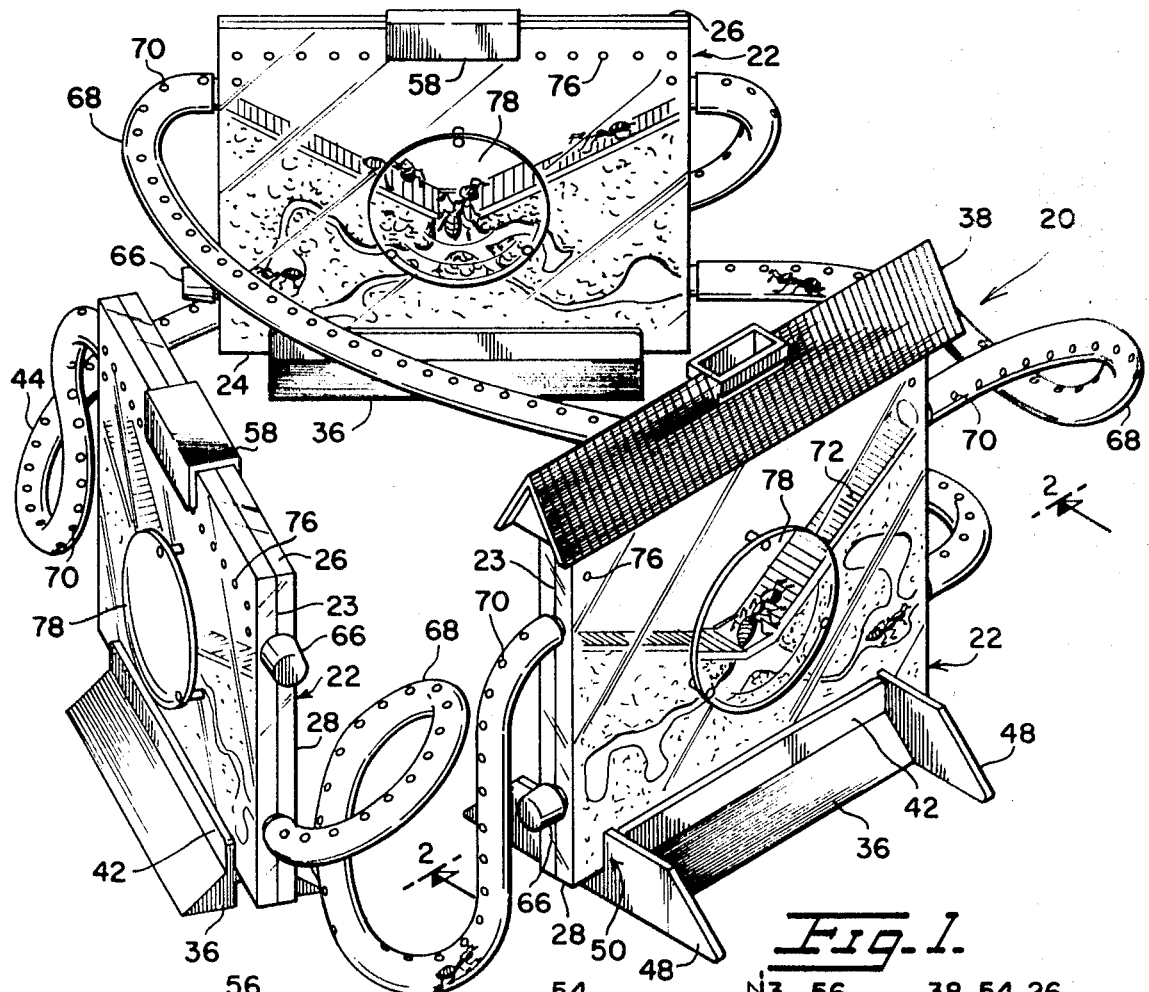
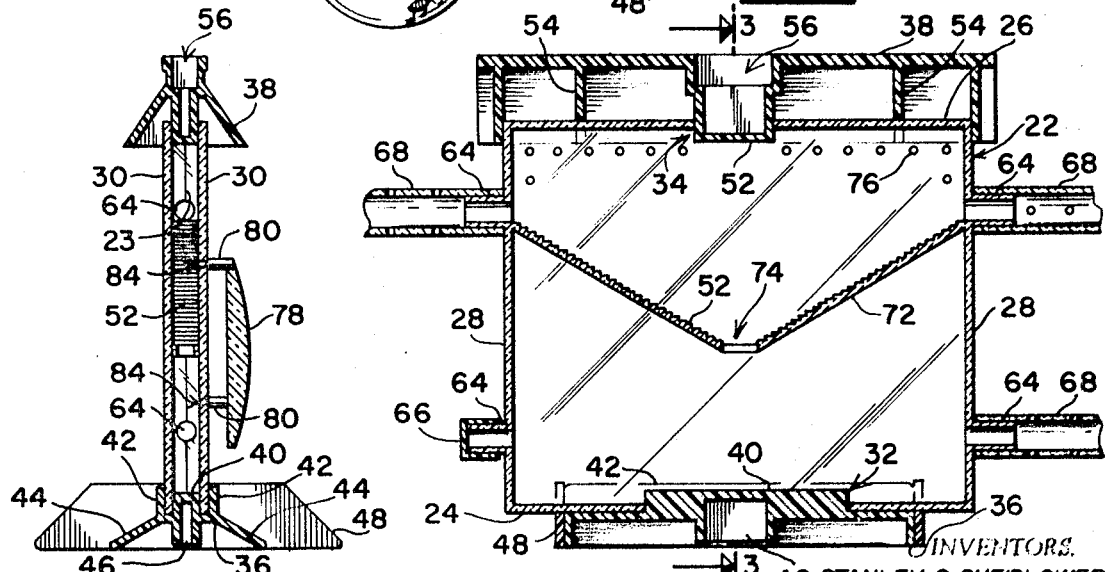

INVENTORS
STANLEY S. SHEIDLOWER
ELLIOT S. GLANZ
BY
Polachek & Saulsbury
ATTORNEYS

ENTOMOLOGICAL OBSERVATION DEVICE

This invention relates to an entomological device, more particularly to a structure for permitting the observation and study of insects, especially insects of the hymenopterous order. Insects of these species usually exhibit some degree of social organization and consequently live in communities or colonies making them susceptible for group observation and study of their behavior patterns.

The entomological device of this invention while applicable for research purposes and scientific study is however designed primarily as an educational apparatus for children.

There has always been a demand for children's educational toys or games, especially those devices which teach and satisfy the inquiring minds of young children while at the same time provide hours of enjoyment and amusement. The entomological observation device was therefore developed to satisfy this requisite and at the same time to help children explore and become familiar with the natural sciences.

The instant invention includes a walled modular structural unit defining an enclosed chamber and advantageously having transparent walls to allow for the observation of activity within the unit. Preferably a setting simulating the natural environment of the particular species of hymenoptera is duplicated within the unit and a magnifying lens may be affixed to one of the transparent walls to enlarge any insects within the field of view. The modular unit is further provided with top and bottom walls having openings for permitting the interlocking engagement with other modular units and assembly or stacking of several of said units. Furthermore, a side wall of the unit includes a fitting for engaging the end of transparent flexible tubing which interconnects different parts of the same unit or two or more separate units to thus permit the insects therein to traverse between the several units.

It is an object therefore of the present invention to provide an entomological observation device of the general character described herein and having the aforementioned advantageous design and construction.

Specifically, it is an object of the present invention to provide an entomological observation device having a modular structural unit adapted to enclose therein insects in a simulated natural environment and encompasses transparent walls for permitting observation of the activity within the units.

It is a further object of the present invention to provide an entomological observation device including a magnifying lens for enlarging any insects within the field of view.

Another object of this invention is to provide a device having modular units which are capable of being assembled or stacked in an interconnected complex of units.

The above and other objects, features and advantages of the invention will be apparent from the following description of the preferred embodiment considered in connection with the accompanying drawings.

In the accompanying drawings in which are shown some of the various possible embodiments of this invention:

FIG. 1 is a perspective view showing three of the said modular structural units containing hymenoptera within a simulated natural environment; the several units shown are not stacked however they are assembled and interconnected by means of flexible transparent plastic tubing.

FIG. 2 is a sectional view taken along line 2—2 of FIG. 1 and shows the partition wall dividing the modular unit into two interconnected compartments, with respective roof and base members engaged through openings in the top and bottom walls of the modular unit, and hollow protuberances or fittings extending from the side walls for connection with the flexible tubing; alternatively the fittings may be capped or sealed, as illustrated.

FIG. 3 is a cross-sectional view taken along line 3—3 of FIG. 2 and further illustrates a magnifying lens affixed to one of the walls of the modular unit.

FIG. 4 is a partial front view and illustrates one method of stacking or assemblying two modular units wherein the lower unit contains a roof member positioned on its top wall and the upper unit has a base member positioned on its bottom wall, the base member has a tab which is accommodated within a recessed portion in the roof member for interlocking the units which are also shown as being interconnected by means of the flexible tubing.

Figure 4:
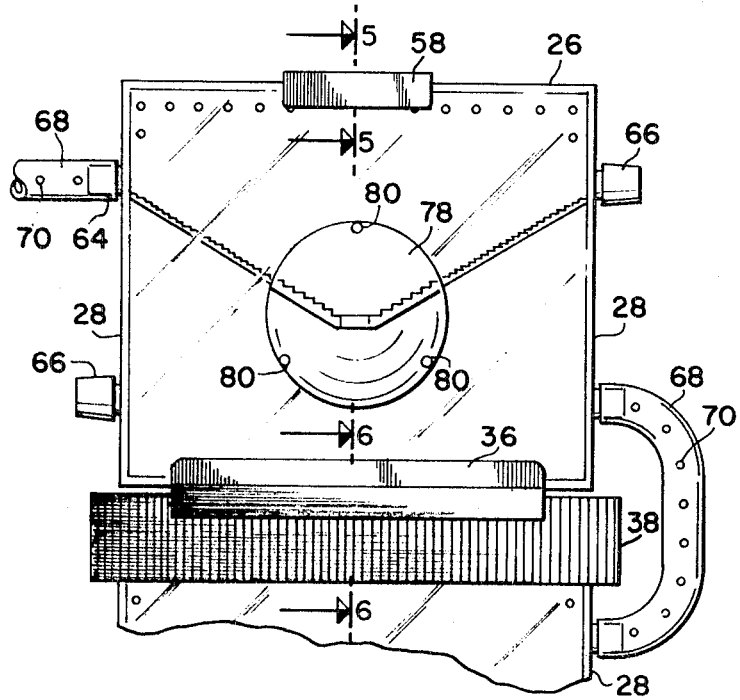

Referring now in detail to the drawings, the reference numeral 20 denotes the entomological observation device of this invention. The device 20 is comprised of a modular structural unit 22 substantially rectangular in shape and having transparent walls which will be described in more detail herein. The modular unit 22 is preferably constructed of a synthetic thermoplastic material, injection molded and formed of two complementary half sections which are joined together and held in a contiguous and abutting relationship in a manner to be hereinafter described, and forming a circumscribing seam 23. The modular units 22 could obviously be constructed from similar or equivalent materials e.g. a glass window may be provided in an opaque wall for permitting observation of activity within the modular unit 22.

The modular unit 22 is comprised of a bottom wall 24, a top wall 26, two side walls 28, and a front and rear wall 30, all interconnected to form enclosed chamber. The bottom wall 24 further defines therein an opening 32 and the top wall 26 defines therein an opening 34. These openings, 32 and 34, are provided to permit access into the enclosed chamber and further are used for accommodating respectively a base member 36 and a roof member 38. The base member 36 will now be described in further detail. The base member 36 is designed to be positioned longitudinally along the bottom wall 24 and to further project into the opening 32 therein. Consequently, the base member 36 contains a projection 40 conforming in size and shape to the opening 32 and adapted to be snugly received in said opening 32. Furthermore, the base member 36 has two upstanding flange portions 42 positioned on either side of the projection 40 and spaced so that the flanges 42 will fit around the bottom wall 24 and bear against the front and rear wall 30 to mold the two complementary half sections of modular unit 22 in a contiguous and abutting relationship. The base member 36 is also provided with two legs 44 extending angularly in opposite directions and away from modular unit 22 for providing support to modular unit 22 and for maintaining same in a substantially vertical plane. A tab 46 is provided between the two legs 44 and oppositely directed from the projection 40 for interlocking engagement with an adjacent modular unit 22. The operation of this tab 46 will be further described herein.

In connection with support for modular unit 22, attention is now directed to the stabilizer supports 48 shown in FIGS. 1 and 3. These stabilizer supports 48 have a notched portion 50 which is adapted to fit around the bottom wall 24 of modular unit 22 to provide added stability to the unit especially when a plurality of said modular units 22 are assembled or stacked in a manner which will be further discussed herein.

The roof member 38 is designed to be positioned longitudinally along the top wall 26 and contains a projection 52 conforming in size and shape to the opening 34 in the top wall 26 and is further adapted to be snugly accommodated within said opening 34. Additionally, two flange portions 54 extend from said roof member 38 and are adapted to fit around top wall 26 and to bear against front and rear wall 30 to thereby hold the two complementary half sections in a contiguous and abutting relationship. The roof member 38 further contains a recessed portion 56 for receiving tab 46 the operation of which will be more fully described in due course.

A channel shaped cover member 58 having a depending portion 60 which is adapted to be snugly received in opening 34 in top wall 26 may be used in place of roof member 38. The cover member 58 also contains two side flanges 62, see FIGS. 4 and 5, adapted to fit around the top wall 26 and to bear against front and rear wall 30 to thereby hold the two complementary half sections of modular unit 22 in a contiguous and abutting relationship.

Each of the two side walls 28 of modular unit 22 contain hollow protuberances or fittings 64 communicating with the interior of the unit 22. These hollow protuberances 64 may be sealed by a cap 66 or alternatively the hollow protuberances 64 may be connected to a flexible tubing 68. The flexible tubing 68 is preferably made of a transparent thermoplastic material to permit observation of the insects moving therein and is further provided with a plurality of vent holes 70. The ends of tubing 68 are adapted to snugly fit around the hollow protuberances 64 and to thereby hold the two complementary half sections of the modular unit 22 in a contiguous and abutting relationship and also will provide an interconnecting passageway between any two of said hollow protuberances 64.

In consideration of the fact that it is desired to simulate a natural setting and environment for the insects contained within modular unit 22, the interior thereof has been divided by means of an angular partition wall 72, into an upper and lower compartment. The compartments are interconnected by a discontinuity along the partition wall 72 thereby defining a passageway 74 between the two compartments. The lower compartment is adapted to be filled with sand, soil or other materials indigenous to the insects' environment. The upper compartment is provided with air vents 76 defined by apertures in the front and rear walls 30. The roof member 38 may be removed to provide access through openings 34 in the top wall 36 so that food, water or other essential items may be introduced into the modular unit 22. The partition wall 72 is advantageously provided with a roughened or stepped surface 52 to facilitate movement thereon by the insects within the modular unit 22. Furthermore, the insects may freely move through passageway 74 and into the material in the lower compartment to thus burrow or tunnel passageways therein which will be clearly visible through the transparent walls of the unit as shown in FIG. 1, and will provide the observer with an opportunity to view the insects as they perform a variety of activities.

In connection with the observation of the insects within modular unit 22, a magnifying lens 78, preferably molded from a thermoplastic material, is affixed to a front or rear wall 30 by means of a plurality of integrally molded legs 80, the ends of which are set within holes 84 in the wall 30 and secured therein by means of an epoxy or other adhesive. The magnifying lens 78 will automatically be positioned a sufficient distance from the wall 30 by means of legs 80, to thus be properly focused on any insects within the field of view and will thereby permit a more intimate examination of the so enlarged or magnified insects.

Figure 5:
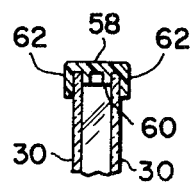
FIG. 5 is a partial sectional view taken along line 5—5 of FIG. 4 and shows a cover member sealing the opening in the top wall of the unit.
Figure 6:
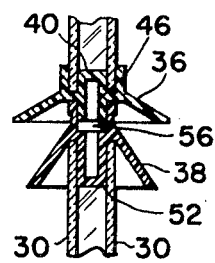
FIG. 6 is a partial sectional view taken along line 6—6 of FIG. 4 and shows the interlocking relationship between the tab extending from the base member on the upper unit and the recessed portion for accommodating said tab provided in the roof member on the lower unit.

As previously mentioned the modular unit 22 may be assembled in a myriad of arrangements. The FIG. 1 illustrates one manner in which three modular units 22 may be interconnected by means of the flexible tubing 68. The FIGS. 4, 6, 7 and 8 illustrate two other methods in which these modular units 22 may be stacked or assembled. In FIG. 4 the base member 36 of the upper modular unit 22 has been interlocked with the roof member 38 of the lower modular unit 22, (partial front view shown). The recessed portion 56 of roof member 38 conforms in size and shape to the opening 34 in the top wall 26 of the modular unit 22. Therefore the tab 46 extending from the base member 36 will be accommodated within the recessed portion 56. The upper and lower modular units 22 will thereby be firmly interlocked in this stacked position and the flexible tubing 68 will interconnect the interior of the two modular units 22.

Figure 7:
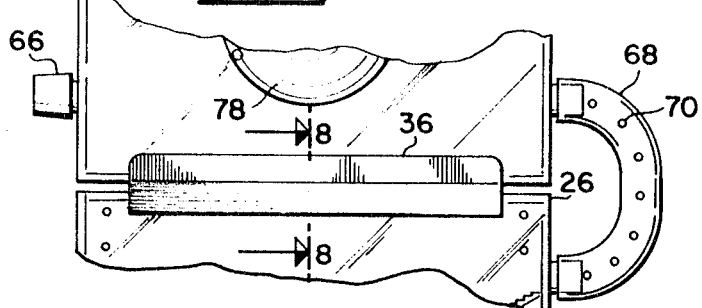
FIG. 7 is a partial front view which illustrates an alternate means for stacking or interconnecting two modular units whereby a base member having a tab extending therefrom is inserted directly into the opening in the top wall of one unit without the imposition of a roof member placed between the base member and the unit.
Figure 8:
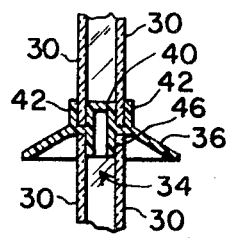
FIG. 8 is a partial sectional view taken along line 8—8 of FIG. 7 illustrating the interlocking of two units by means of a single base member.

Another method of interlocking two modular units 22 is illustrated in FIG. 7 wherein a base member 36 supporting an upper modular unit 22 is interlocked with a lower modular unit 22 by means of tab 46, said tab 46 being inserted directly into the opening 34 in the top wall 26 of the lower modular unit 22. It should thus be evident that two modular units 22 can be stacked one above the other with or without the interposed roof member 38.

Figure 9:
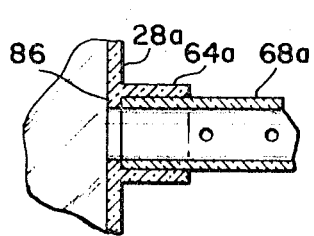
FIG. 9 is an enlarged partial front view which illustrates an alternate embodiment wherein a hollow protuberance extends from the side wall and is adapted to be engaged around the end of the flexible tubing.

In an alternate embodiment shown in FIG. 9 the hollow protuberance 64a in side wall 28a has been modified such that the diameter is larger than the diameter of the flexible tubing 68a, and an annular shoulder 86 extending radially inward from the protuberance 64a has been incorporated to insure the correct positioning of the end of the flexible tubing 68a.

Figure 10:
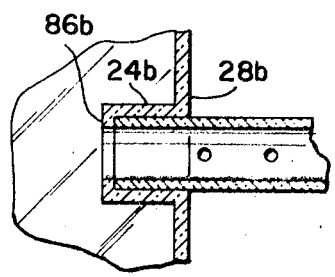
FIG. 10 is an enlarged partial front view showing a further embodiment wherein the side wall is provided with recessed annular fitting adapted to accommodate the end of the flexible tubing.

In a further modification illustrated in FIG. 10, a recessed annular fitting 64b is provided in side wall 28b and includes an annular shoulder 86b for limiting the projection and insuring the correct positioning of flexible tubing 68b within the modular unit 22.

The above cited embodiments are intended as exemplary and while they have described the invention with a specific implementation thereof, other modifications and various changes might be made in the embodiment as so set forth and will be apparent to those skilled in the art.

It should therefore be understood that all material herein described or shown in the accompanying drawings is to be interpreted as illustrative and not in a limiting sense.

We claim:

1. An entomological device designed to facilitate the observation and study of insects in their natural environment comprising a walled modular structural unit having at least one transparent wall, said walled unit defining an enclosed chamber within which the natural environment of the insects can be duplicated, at least one opening in a wall of the unit for providing access into said chamber, vent means within a wall of the unit for permitting air to enter into the chamber, a base member adapted to be engaged by the unit to position the unit in a substantially vertical plane, interlocking means for securely attaching a plurality of modular units to one another and conduit means for interconnecting the enclosed chambers of a plurality of units; a partition wall within the chamber separating the chamber into at least two compartments having an interconnecting passageway; a magnifying lens affixed to a transparent wall of the modular unit for enlarging insects within the field of view, a bottom wall of the modular unit defines an opening therein and the base member has a projection adapted to extend upwardly and to be inserted into the device through the bottom wall opening and snugly accommodated therein, thus securing the device to the base; a top wall of the modular unit defines an opening and further including a roof member having a projection adapted to extend downwardly and to be inserted into the device through the top wall opening and snugly accommodated therein, thus sealing the top wall opening, said interlocking means comprises a tab extending from the base member of a first modular unit, said tab being adapted to extend downwardly and to be inserted into the top wall opening of a second modular unit and snugly accommodated therein, thus firmly holding and joining together two separate modular units.

2. An entomological device as claimed in claim 1, wherein the roof member defines a recessed portion, and the interlocking means comprises a tab extending from the base member of a first modular unit, said tab being adapted to extend downwardly and to be inserted into the recessed portion of the roof member affixed to a second modular unit and snugly accommodated therein, thus firmly holding and joining together two separate modular units.

3. An entomological device as claimed in claim 2, wherein a side wall of the unit has a hollow protuberance for providing a means of communication into the enclosed chamber and further including a cap adapted to be frictionally positioned over the protuberance to selectively seal the chamber.

4. An entomological device as claimed in claim 3, wherein the conduit means for interconnecting the enclosed chamber comprises flexible tubing having a plurality of vent holes therein, the ends of the tubing being adapted for engagement by the hollow protuberance.

5. An entomological device as claimed in claim 4, wherein the side wall has a recessed annular fitting for accommodating an end of a transparent flexible plastic tubing.

* * * * *